United States Patent [19]
Eifert

[11] Patent Number: 5,500,882
[45] Date of Patent: Mar. 19, 1996

[54] PORTABLE FLOW TIMER DEVICE

[76] Inventor: John W. Eifert, 6001 Eurith Ave., Baltimore, Md. 21206

[21] Appl. No.: 359,913

[22] Filed: Dec. 20, 1994

[51] Int. Cl.⁶ .................................................. G01F 3/00
[52] U.S. Cl. ..................... 377/21; 137/554; 137/624.11; 377/112
[58] Field of Search ................ 377/21, 112; 137/554, 137/624.11

[56] References Cited

U.S. PATENT DOCUMENTS

| | | | |
|---|---|---|---|
| 4,321,461 | 3/1982 | Walter et al. | 377/21 |
| 5,086,806 | 2/1992 | Engler et al. | 137/486 |

*Primary Examiner*—John S. Heyman

[57] ABSTRACT

A portable flow timer device for determining the time between two successive fluid flow detection signals input thereto comprising an electric timer mechanism including an input probe connector mechanism for receiving fluid flow detection signals from external fluid detection probes coupleable thereto, a bridge circuit mechanism for receiving a fluid flow detection signal and transmitting a timer activation signal and for receiving a succeeding fluid flow detection signal and transmitting a timer de-activation signal, a resetable count-down logic mechanism for transmitting a plurality of timer signals at a set timing interval based upon receipt of the timer activation signal and for preventing transmission of the timer signals based upon receipt of the timer de-activation signal, a display mechanism for receiving the timer signals and displaying elapsed time from receipt of timer signals up to their cessation, and a battery mechanism for supplying electric energy for operation.

6 Claims, 5 Drawing Sheets

PORTABLE FLOW TIMER DEVICE

BACKGROUND OF THE INVENTION

1. Field of the Invention

The present invention relates to a portable flow timer device and more particularly pertains to determining the time between two successive fluid flow detection signals input thereto with a portable flow timer device.

2. Description of the Prior Art

The use of flow timer apparatuses is known in the prior art. More specifically, flow timer apparatuses heretofore devised and utilized for the purpose of measuring time between successive input flow signals are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,352,288 to Paap et al. discloses measurement of salt content in petroleum flow lines. U.S. Pat. No. 4,380,166 to Crombie discloses testing apparatus for -a dual pressure indicator and control unit for pasteurization equipment. U.S. Pat. No. 4,801,466 to Clyne et al. discloses a pasteurization monitoring process. U.S. Pat. No. 4,841,457 to Clyne et al. discloses a pasteurization monitoring process. U.S. Pat. No. 5,291,791 to Lucas et al. discloses a capacitance flow meter. The Lumenite Electronic Company of Franklin Park, Ill., manufactures a milk pasteurization testing system.

While these devices fulfill their respective, particular objective and requirements, the aforementioned patents do not describe a portable flow timer device that allows the time between two successive fluid flow signals to be determined using a digital electric timer circuit that is powered by a battery and contained in a compact portable container.

In this respect, the portable flow timer device according to the present invention substantially departs from the conventional concepts and designs of the prior art, and in doing so provides an apparatus primarily developed for the purpose of determining the time between two successive fluid flow detection signals input thereto.

Therefore, it can be appreciated that there exists a continuing need for new and improved portable flow timer device which can be used for determining the time between two successive fluid flow detection signals input thereto. In this regard, the present invention substantially fulfills this need.

SUMMARY OF THE INVENTION

In the view of the foregoing disadvantages inherent in the known types of flow timer apparatuses now present in the prior art, the present invention provides an improved portable flow timer device. As such, the general purpose of the present invention, which will be described subsequently in greater detail, is to provide a new and improved portable flow timer device and method which has all the advantages of the prior art and none of the disadvantages.

To attain this, the present invention essentially comprises, in combination, a hollow rectangular rigid box-shaped container having a bottom wall, four side walls extended upwards from the bottom wall to define a hollow interior and a top opening, and a control panel disposed over the opening with its periphery coupled to the side walls. A rigid lid is included and pivotally coupled to a side wall with a hinge. The lid is positionable over the control panel in facing contact. Also provided is a latch mechanism for removably coupling the lid to the container to thereby preclude access to the control panel.

An electric timer mechanism is included and disposed within the container. The electric timer mechanism includes an input probe connector mechanism extended through the control panel for receiving fluid flow detection signals from a pair of external fluid detection probes coupleable thereto. The electric timer mechanism includes a bridge circuit mechanism coupled to the input probe connector mechanism for receiving a fluid flow detection signal and transmitting a timer activation signal. Furthermore, the bridge circuit mechanism is used for receiving a succeeding fluid flow detection signal and transmitting a timer de-activation signal. The bridge circuit mechanism includes an amplifying mechanism for amplifying the fluid flow detection signals to a set level and a calibration mechanism coupled to the amplifying mechanism for allowing the set level to be adjusted. The electric timer mechanism includes a resetable count-down logic mechanism coupled to the bridge circuit mechanism for transmitting a plurality of timer signals at a set timing interval based upon receipt of the timer activation signal. Additionally, the resetable count-down logic mechanism prevents transmission of the timer signals based upon receipt of the timer de-activation signal. The electric timer mechanism includes an oscillator mechanism coupled to the count-down logic mechanism for setting the timing interval at which the timer signals are transmitted and with the timing interval set at 1/100th of a second. The electric timer mechanism includes a display mechanism coupled to the count-down logic mechanism for receiving the timer signals therefrom and for displaying from the control panel the elapsed time from receipt of timer signals up to their cessation.

The electric timer mechanism includes a timer reset switch mechanism coupled to the count-down logic mechanism and extended through the control panel for resetting the count-down logic mechanism and thereby resetting the display mechanism at an initial value. The electric timer mechanism includes a removable battery mechanism coupled to the bridge circuit mechanism, count-down logic mechanism, oscillator mechanism, display mechanism, and timer reset switch mechanism for supplying electric energy for operation. The electric timer mechanism includes a lamp test mechanism coupled to the display mechanism and battery mechanism for checking their operability. Lastly, the electric timer mechanism includes a power switch mechanism coupled between the battery mechanism and the bridge circuit mechanism, count-down logic mechanism, oscillator mechanism, display mechanism, and timer reset switch mechanism. Furthermore, the power switch mechanism is extended through the control panel. The power switch mechanism has one orientation for allowing electrical energy to be for operation and another orientation for preventing such delivery.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved portable flow timer device which has all the advantages of the prior art flow timer apparatuses and none of the disadvantages.

It is another object of the present invention to provide a new and improved portable flow timer device which may be easily and efficiently manufactured and marketed.

It is a further object of the present invention to provide a new and improved portable flow timer device which is of durable and reliable construction.

An even further object of the present invention is to provide a new and improved portable flow timer device which is susceptible of a low cost of manufacture with regard to both materials and labor, and which accordingly is then susceptible of low prices of sale to the consuming public, thereby making such a portable flow timer device economically available to the buying public.

Still yet another object of the present invention is to provide a new and improved portable flow timer device which provides in the apparatuses and methods of the prior art some of the advantages thereof, while simultaneously overcoming some of the disadvantages normally associated therewith.

Even still another object of the present invention is to provide a new and improved portable flow timer device for determining the time between two successive fluid flow detection signals input thereto.

Lastly, it is an object of the present invention to provide a new and improved portable flow timer device comprising an electric timer mechanism including an input probe connector mechanism for receiving fluid flow detection signals from external fluid detection probes coupleable thereto, a bridge circuit mechanism coupled to the input probe connector mechanism for receiving a fluid flow detection signal and transmitting a timer activation signal and for receiving a succeeding fluid flow detection signal and transmitting a timer de-activation signal, a resetable count-down logic mechanism coupled to the bridge circuit mechanism for transmitting a plurality of timer signals at a set timing interval based upon receipt of the timer activation signal and for preventing transmission of the timer signals based upon receipt of the timer de-activation signal, a display mechanism coupled to the count-down logic mechanism for receiving the timer signals therefrom and displaying elapsed time from receipt of timer signals up to their cessation, and a battery mechanism for supplying electric energy for operation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

With reference now to the drawings, the preferred embodiment of the new and improved portable flow timer device embodying the principles and concepts of the present invention and generally designated by the reference number 10 will be described.

The present invention is comprised of a plurality of components. In their broadest context, such components include a container and a timer mechanism. Such components are individually configured and correlated with respect to each other to provide the intended function of determining the time between two successive fluid flow detection signals. These fluid flow detection signals are input to the present invention through a pair of spaced fluid detection probes extended within a fluid line.

Figure 1:
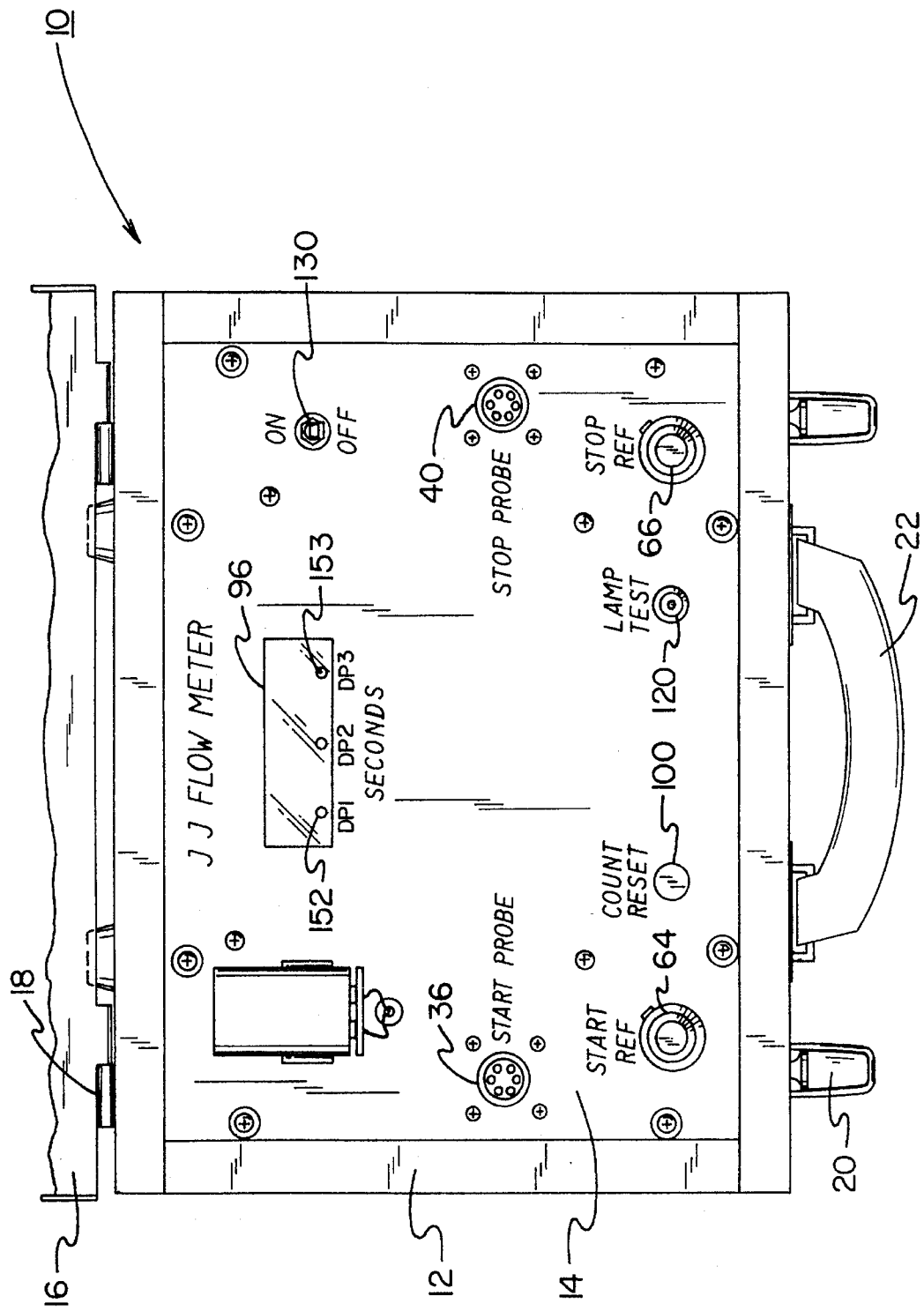
FIG. 1 is a plan view of the control panel and container of the preferred embodiment of the present invention.

Specifically, the present invention includes a box-shaped container 12 as shown in FIG. 1. The container is hollow and rectangular in structure. It is formed of a rigid material such as metal or plastic. The container has a bottom wall and four planar side walls extended upwards from the bottom to define a hollow interior and a top opening for allowing access to the interior. A planar rigid control panel 14 is disposed over the opening. The periphery of the control panel is coupled to the side walls adjacent to the interior near the top opening. Furthermore, a generally planar rigid lid 16 is pivotally coupled to a side wall. The pivotal coupling of the lid to the container is performed with a hinge 18. The lid is positionable over the control panel in facing contact and further positionable remote therefrom. Also included is a latch mechanism 20. The latch mechanism is coupled to the container and lid. The latch mechanism removably couples the lid to the container to preclude access to the control panel. Furthermore, a handle 22 is coupled to the container for allowing a firm grip by a user for transporting the container from one location to another.

Figure 2:
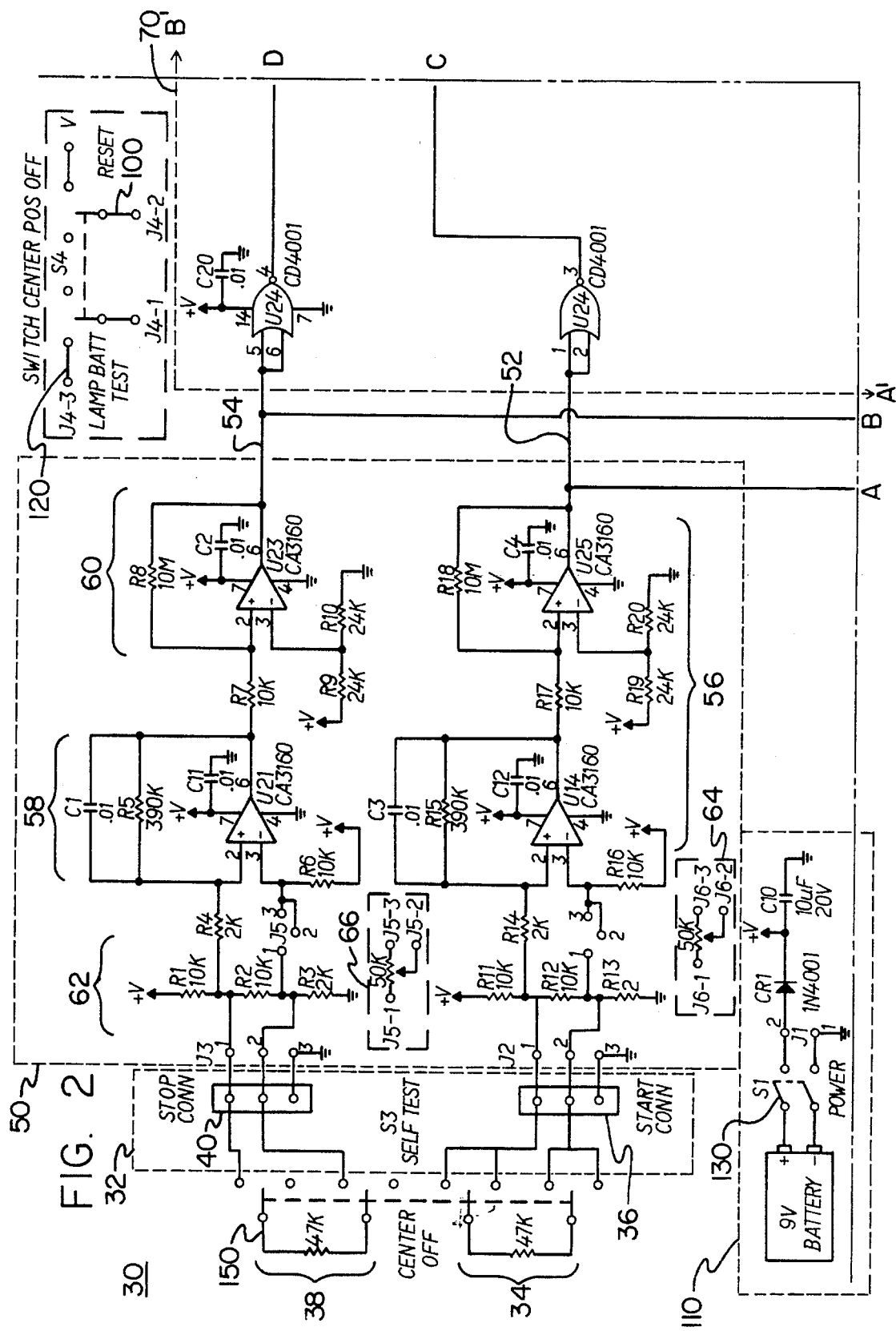
FIG. 2 is a schematic diagram of the upper left hand portion of the timer mechanism of the present invention.

The present invention also includes an electric timer mechanism 30 as shown in FIGS. 2 through 5. The electric timer mechanism is disposed within the container 12. The electric timer mechanism includes an input probe connector mechanism 32 as illustrated in FIG. 2. The input probe mechanism is extended through the control panel 14 for receiving fluid flow detection signals from a pair of external fluid detection probes coupleable thereto. A first fluid detection probe 34 is coupleable to the START connector 36 as shown in FIG. 2. The second fluid detection probe 38 is coupleable to the STOP connector 40. The second fluid detection probe is positioned within a pipe at a location downstream from the first fluid detection probe. Each connector 36,40 is adapted to receive a six-pin plug end of a fluid detection probe as best illustrated in FIG. 1.

Also provided as part of the timer mechanism 30 is a bridge circuit mechanism 50 as shown in FIG. 2. The bridge circuit mechanism is coupled to the input probe connector mechanism 32 for receiving a fluid flow detection signal from fluid detection probe 34 and transmitting a timer activation signal at output 52. Furthermore, the bridge circuit mechanism is used for receiving a succeeding fluid flow detection signal from fluid detection probe 38 and transmitting a timer de-activation signal at output 54. The bridge circuit mechanism includes an amplifying mechanism 56 for amplifying the fluid flow detection signals to a set level compatible for activating integrated circuit logic circuitry. When the first fluid flow detection signal is amplified to an appropriate level, it is designated as a timer activation signal. When the successive fluid flow detection signal is amplified to an appropriate level, it is designated as a timer de-activation signal. The amplifying mechanism 56 of the bridge circuit mechanism includes a pair of cascaded amplifier networks. Each amplifier network is formed of a first stage integration amplifier 58 followed by a second stage basic amplifier 60. Standard commercially available CA3160 operational amplifiers are used in constructing the amplifier networks. The bridge circuit mechanism also includes a calibration mechanism 62. The calibration mechanism includes a voltage divider network and associated potentiometers 64 and 66 as shown in FIG. 1 and FIG. 2. The calibration mechanism allows the level of the fluid flow detection signals to be modified as desired through adjustment of the potentiometers 64, 66.

Also provided is a resetable count-down logic mechanism 70 as shown in FIGS. 2, 3, 4, and 5 (the count-down logic mechanism 70 is bounded by a dashed periphery denoted as A'B'C'D'). The count-down logic mechanism is coupled to the bridge circuit mechanism 50. The count-down logic mechanism transmits a plurality of timer signals at a set timing interval based upon receipt of the timer activation signal at output 52. The count-down logic means also prevents transmission of timer signals based upon receipt of the timer de-activation signal at output 54. The count-down logic mechanism includes down-counter circuitry 72 formed of commercially available CD40102 binary-code decimal down-counter integrated circuits. The remaining circuitry of the count-down logic mechanism is formed of standard combinatorial and flip-flop circuitry formed of commercially available CD4001 Quad 2-input NOR gates, CD4071 Quad 2-input OR gates, and CD4013 Dual D Flip-Flops with set/reset.

Figure 4:
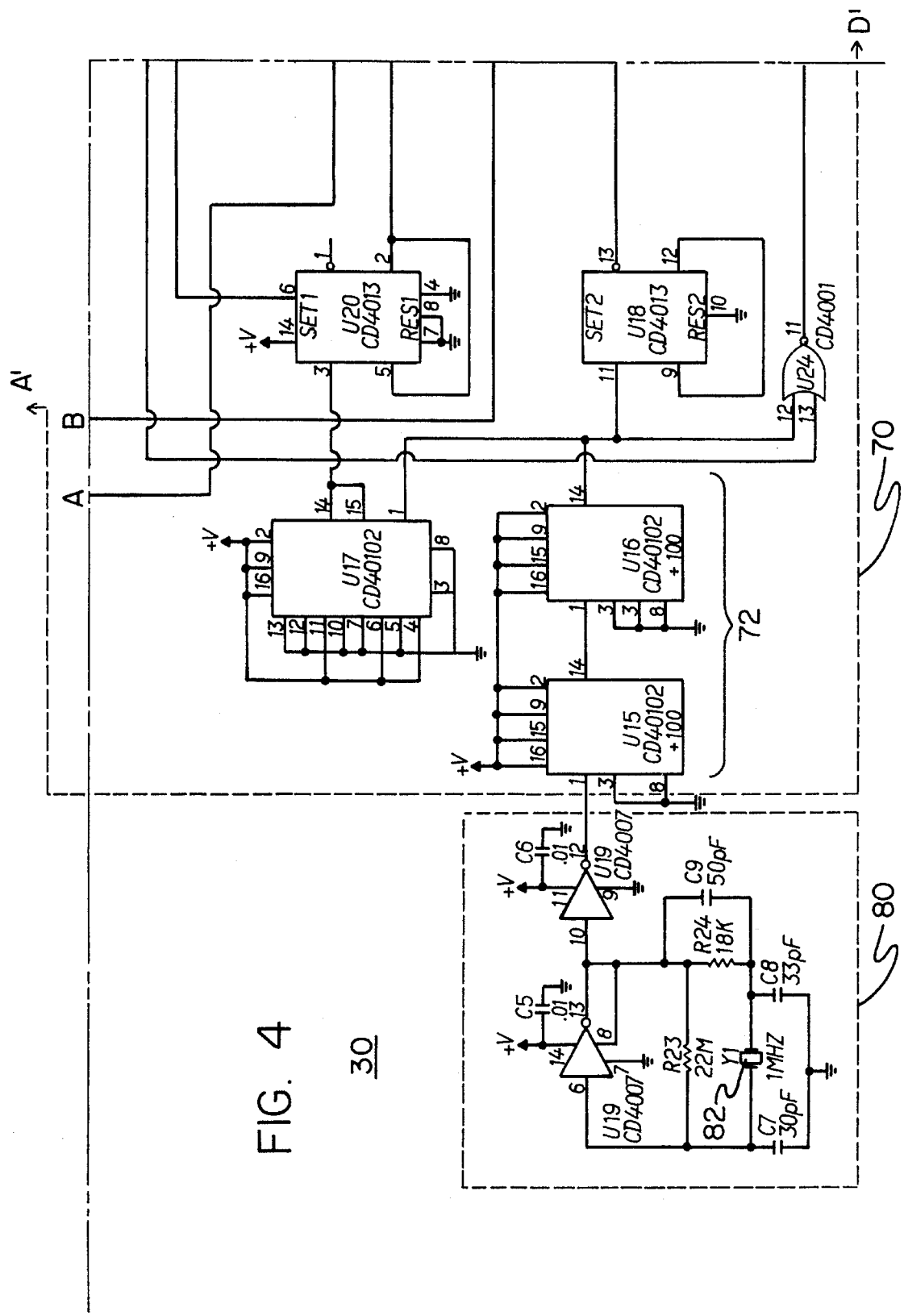
FIG. 4 is a schematic diagram of the lower left hand portion of the timer mechanism of the present invention.

An oscillator mechanism 80 is coupled to the count-down logic mechanism 70 for setting the timing interval at which the timing signals are transmitted. As shown in FIG. 4, the oscillator mechanism 80 includes a 1 MHz crystal 82 with appropriate isolation and CD4007 inverter circuitry coupled thereto for generating a compatible output for use. The oscillator mechanism sets the timing interval between successive generation of timer signals of the count-down logic means 70 at 1/100 of a second.

Figure 3:
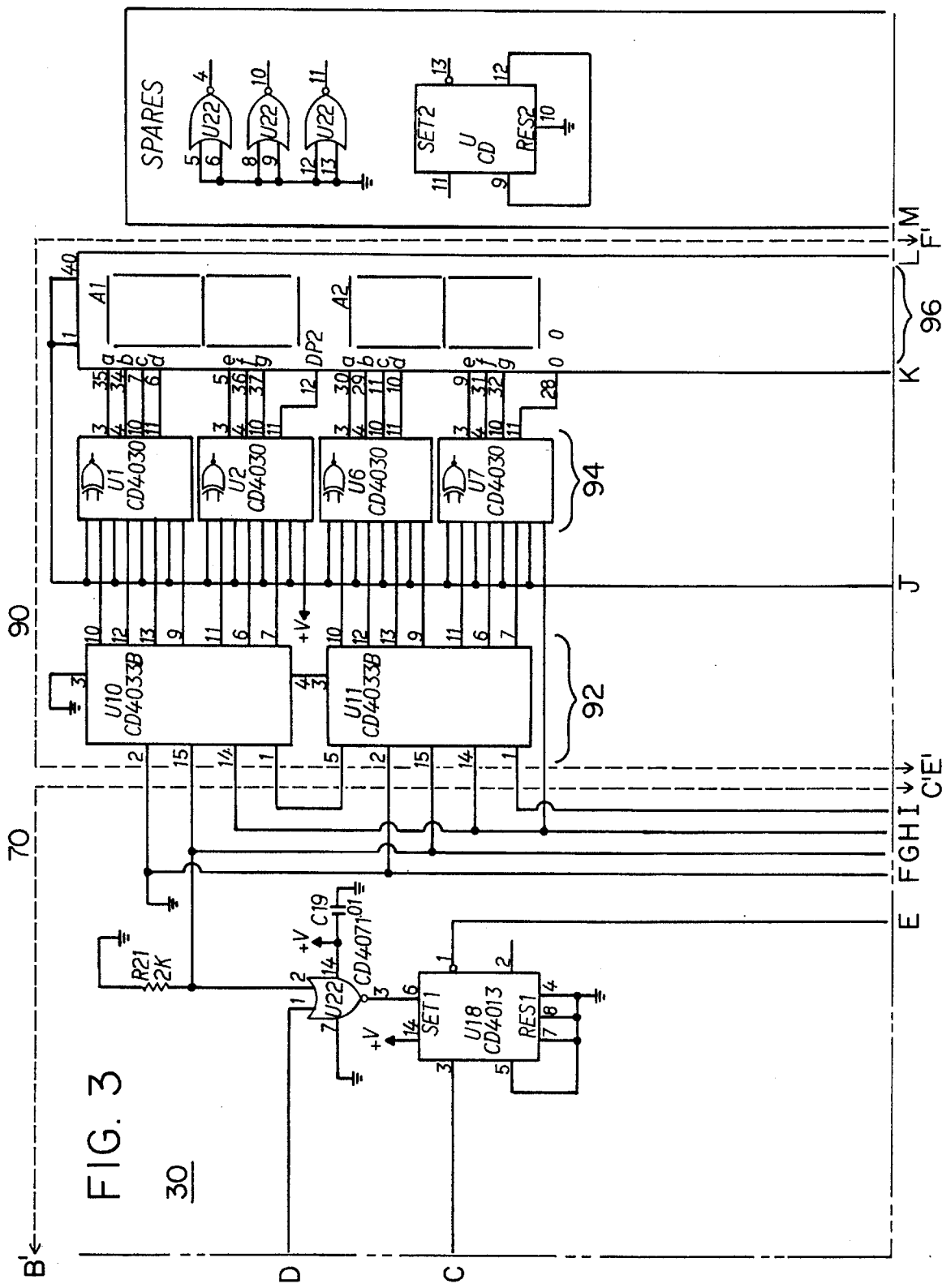
FIG. 3 is a schematic diagram of the upper right hand portion of the timer mechanism of the present invention.
Figure 5:
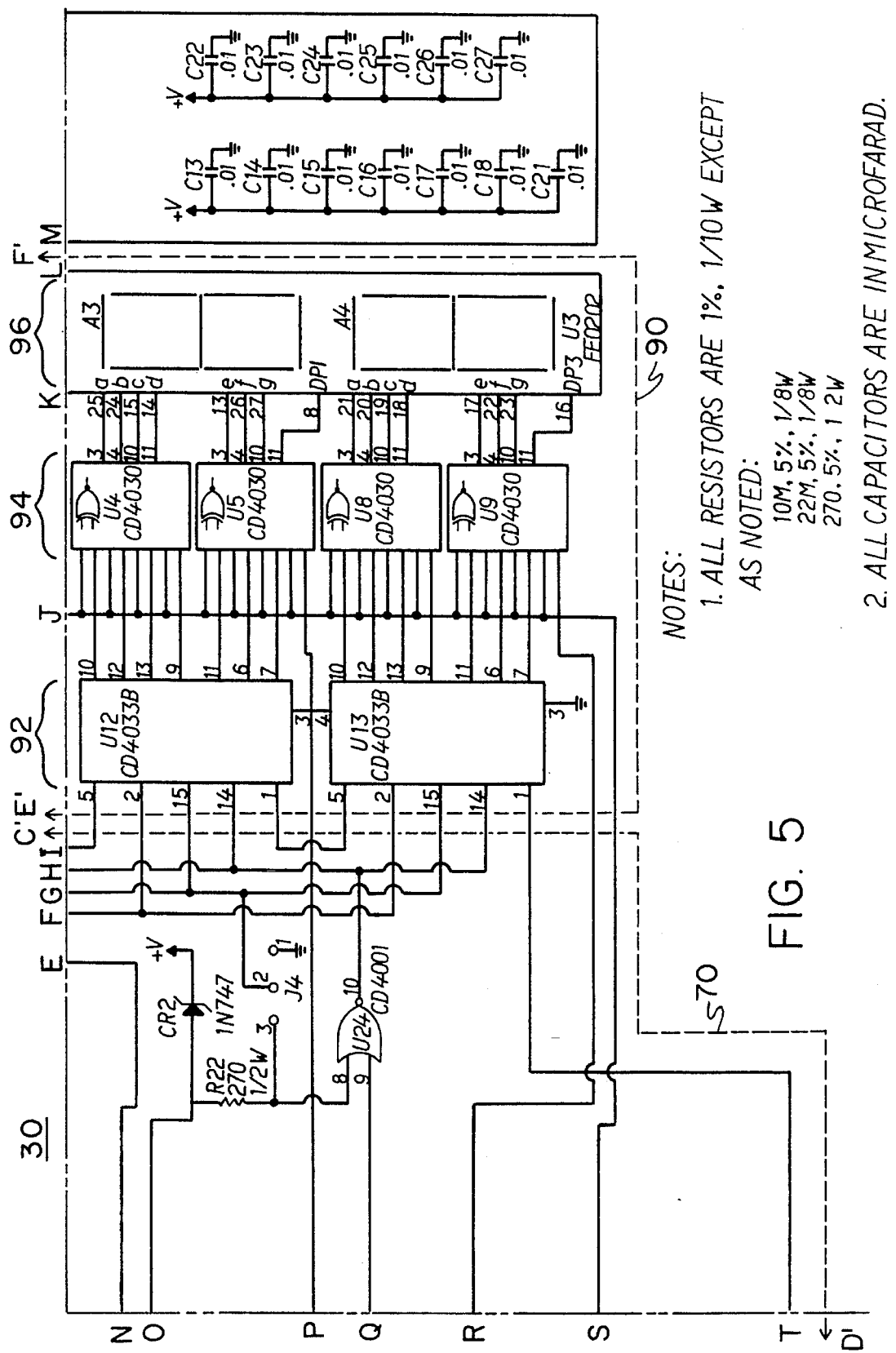
FIG. 5 is a schematic diagram of the lower right hand portion of the timer mechanism of the present invention.

A display mechanism 90 is also provided and is shown in FIGS. 3 and 5 (the display mechanism 90 is bounded by a dashed periphery denoted by E'F'). The display mechanism is coupled to the count-down logic mechanism 70 for receiving the timer signals therefrom. The display mechanism then displays the elapsed time from receipt of timer signals up to their cessation. The elapsed time is viewable from the control panel 14. The display mechanism includes commercially available CD4033 binary to 7-segment display decoder circuitry 92. The output of the decoder circuitry 92 is then fed to a combinatorial network 94 formed of commercially available CD4030 EXCLUSIVE-OR gates. Lastly, the output of the combinatorial network 94 is fed to a commercially available FE0202 4-digit 7-segment liquid crystal display (LCD) 96 as shown extended across FIGS. 3 and 5 as well as projected from the control panel 14 in FIG. 1.

The timer mechanism 30 also includes a timer reset switch mechanism 100 as shown in FIGS. 1 and 2. The timer reset switch mechanism is coupled to the count-down logic mechanism 70 and extended through the control panel 14. The timer reset switch mechanism allows a user to reset the count-down logic mechanism. When the count-down logic mechanism is reset, the display mechanism 90 is reset to an initial value.

Also provided is a removable battery mechanism 100 as shown in FIG. 2. The battery mechanism is coupled to the bridge circuit mechanism 50, count-down logic mechanism 70, oscillator mechanism 80, display mechanism 90, and timer reset switch mechanism 100. The battery mechanism supplies electric energy to the aforementioned mechanisms for operation. In the preferred embodiment, a commercially available 9 volt battery is used.

To perform a self-test function, a lamp test mechanism 120 is included as shown in FIG. 2. The lamp test mechanism is coupled to the display mechanism 90 and battery mechanism 110. The lamp test mechanism is used for checking the operability of the display mechanism and battery mechanism. A button is extended through the control panel 17 and may be actuated for performing this check as best illustrated in FIG. 1. When the lamp test mechanism is actuated, all segments on the liquid crystal display 96 are illuminated. The lamp test mechanism also places a simulated load on the battery mechanism to ensure its operability.

A power switch mechanism 130 is included. The power switch mechanism is coupled between the battery mechanism 110 and the bridge circuit mechanism 50, count-down logic mechanism 70, oscillator mechanism 80, display mechanism 90, and timer reset switch mechanism as shown in FIG. 2. Furthermore, the power switch mechanism is extended through the control panel 14 for actuation by a user as shown in FIG. 1. The power switch mechanism has one orientation for allowing electrical energy to be transmitted to the timer mechanism 30. It also has another orientation for preventing such delivery.

To set up a test using the present invention, the timer mechanism 30 is connected to a milk pasteurization pipe or other such pipe for test via two cables 150 as shown in FIG. 2. Each cable is about 50 feet long. These cables are 100% shielded wires with adapters for allowing them to be connected to probes 34 and 38 that are installed within the milk pasteurization pipes. The cables 150 are then connected to the START and STOP connectors 36, 40 of the timer mechanism 30. The shielded wires protect the timer mechanism 30 from external noise that is generated from pumps operating in association with the milk pasteurization pipe. The bridge circuit mechanism includes 10-turn precision potentiometers 64, 66. Now, with water flowing in the milk pasteurization pipe, the START reference potentiometer 64 is adjusted from zero on the display 96 to a point where a decimal point 152 is displayed on the left side of the display (DP1) as shown in FIG. 1. This same procedure is used to set the STOP reference potentiometer 66 such that a decimal point 153 is displayed on the right side of the display (DP3). Each of the precision potentiometers is one leg of the input bridge circuit mechanism 50. When the potentiometer is turned from zero, the output voltage at pin 6 of U21 or U14 of FIG. 2 decreases from a high of 8 volts. The input buffer integration amplifier 58 also acts as a noise filter. When the output of U21 or U14 reaches half its original voltage, usually 4 volts, the second amplifier 60, U23 or U25, switches from its original zero volts to its highest level, normally 8 volts.

When a saline solution is injected into the water currently in the milk pasteurization pipes and reaches the START probe 34, the bridge circuit mechanism 50 is unbalanced, thereby causing the voltage at U25, pin 6, as shown in FIG. 2 to return to zero. This actuation starts integrated circuit U13 as shown in FIG. 5 counting. This integrated circuit U13 is a CD4033 decade counter/divider with 7-segment display output. At the same time, the decimal point 152 (DP1) goes off. The display now display the timing counts.

Subsequently, when the saline solution reaches the STOP probe 38, the bridge circuit mechanism 50 is unbalanced, causing the voltage at U23, pin 6, as shown in FIG. 2 to return to zero, thereby stopping the clock at U13, pin 1, of FIG. 5. The time between flow points is displayed in seconds, and the decimal point 153 (DP3) of display 96 is turned off.

A 1 MHz oscillator 82 as shown in FIG. 4 is counted down to 100 Hz. This oscillator is gated to U13, pin 1, as shown in FIG. 5. The timer signal is further divided by U17, shaped by U20, and gated to lamp test pins on the 7-segment decoder integrated circuits as shown in FIG. 5. When the battery voltage is pulled to approximately 4 volts, the display 92 will flash off and on. The lamp and battery test switch 120 should be activated before starting any test. The battery is good if the display stays on. The CD 4030 integrated circuits 94 are used to blink the liquid crystal display 96 at a 100 Hz rate. The reset switch 100 resets U18 as shown in FIG. 4, U10 and U11 as shown in FIG. 3, and U12 and U13 as shown in FIG. 5 before any test is started. The retest switch also blanks the display, showing a count of "0000". The lamp test switch 120 is used to run a unit self-test without using probes 34, 38 and cable 150.

No printer is used with the present invention as with some prior art embodiments, because tests are performed in normally wet areas where paper of the printer is ruined. Alternating current (AC) power is not used because it is dangerous in wet areas and it also creates ground currents. Thus, a battery is preferable for use in this environment. The present invention is quiet, safe, and reliable when connected with the proper cabling. In the preferred embodiment, the timer mechanism 30 is sealed in an aluminum container 12.

The present invention is a battery-powered flow timer used to calibrate the fluid flow through dairy pasteurization equipment. U.S. Public Health Code states that milk must be heated to a minimum of 160° F. and held there for at least 15 seconds. The present invention is contained in a waterproof aluminum case. Located on the front panel are power, reset, self-test, battery test, and ON/OFF switches. A liquid crystal display, start probe and stop probe connectors and 2 potentiometers are also located on this panel. Inside the container is a printed circuit board with a 1 megahertz crystal-controlled oscillator, 2 precision bridge input circuits, digital count-down logic, and C-MOS logic integrated circuits.

The input bridges are balanced using water as the fluid and the potentiometers. Two probes from the pasteurization equipment connect to the start and stop connectors on the front panel. The upstream probe starts the timer at the introduction of a saline solution (electrolyte), and the downstream probe starts the timer circuit when the salines reaches it. The proper flow in the pipe to meet the 15 second minimum is determined using this instrument. For safety in wet environments, the present invention uses 9 volts DC rather than 100 volts AC. This minimizes stray currents. The present invention can be calibrated to operate with different types of probes and fluids.

The present invention includes an aluminum box approximately 9 inches by 12 inches. An LCD display counts seconds to 99.99. The present invention also includes two 10-turn potentiometers. The unit tests the time that a saltwater solution takes to flow through a pipe. Typically this time is 10 seconds. The start and stop connectors are cable to probes that are permanently installed in the pipes. With water flowing, the input bridges are balanced with the precision potentiometers. Next, a salt solution is injected which starts the count-down and runs until the stop probe circuit reacts to the solution.

The circuit includes a 1 megahertz crystal controlled oscillator, 2 precision bridge input circuits, digital count-down logic to obtain 1/100th of a second, a liquid crystal display, and switches for reset, battery test, lamp test, and self-test. Also circuitry is soldered on a printed circuit board. The integrated circuits used are CD series RCA C-MOS logic.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A portable flow timer device for determining the time between two successive fluid flow detection signals input thereto by a pair of spaced fluid detection probes extended within a fluid line comprising, in combination:

a hollow rectangular rigid box-shaped container having a bottom wall, four side walls extended upwards from the bottom wall to define a hollow interior and a top opening, and a control panel disposed over the opening with its periphery coupled to the side walls;

a rigid lid pivotally coupled to a side wall with a hinge and positionable over the control panel in facing contact;

latch means for removably coupling the lid to the container to thereby preclude access to the control panel;

electric timer means disposed within the container and further comprising:

input probe connector means extended through the control panel for receiving fluid flow detection signals from a pair of external fluid detection probes coupleable thereto;

bridge circuit means coupled to the input probe connector means for receiving a fluid flow detection signal and transmitting a timer activation signal and for receiving a succeeding fluid flow detection signal and transmitting a timer de-activation signal, the bridge circuit means including amplifying means for amplifying the fluid flow detection signals to a set level and calibration means coupled to the amplifying means for allowing the set level to be adjusted;

resetable count-down logic means coupled to the bridge circuit means for transmitting a plurality of timer signals at a set timing interval based upon receipt of the timer activation signal and for preventing transmission of the timer signals based upon receipt of the timer de-activation signal;

oscillator means coupled to the count-down logic means for setting the timing interval at which the timer signals are transmitted and with the timing interval set at 1/100th of a second;

display means coupled to the count-down logic means for receiving the timer signals therefrom and for displaying from the control panel the elapsed time from receipt of timer signals up to their cessation; and timer reset switch means coupled to the count-down logic means and extended through the control panel for resetting the count-down logic means and thereby resetting the display means at an initial value;

removable battery means coupled to the bridge circuit means, the count-down logic means, the oscillator means, the display means, and the timer reset switch means for supplying electric energy for operation; and lamp test means coupled to the display means and battery means for checking their operability; and, power switch means coupled between the battery means and the bridge circuit means, the count-down logic means, the oscillator means, the display means, and the timer reset switch means and extended through the control panel, the power switch means having one orientation for allowing electrical energy to be delivered for operation and another orientation for preventing such delivery.

2. A portable flow timer device for determining the time between two successive fluid flow detection signals input thereto comprising:

electric timer means including input probe connector means for receiving fluid flow detection signals from a pair external fluid detection probes coupleable thereto; bridge circuit means including amplifying means for amplifying the fluid flow detection signals to a set level and calibration means coupled to the amplifying means for allowing the set level to be adjusted, the bridge circuit means coupled to the input probe connector means for receiving a fluid flow detection signal from a first probe and transmitting a timer activation signal thereupon and for receiving a succeeding fluid flow detection signal from a second probe and transmitting a timer de-activation signal thereupon; resetable count-down logic means coupled to the bridge circuit means for transmitting a plurality of timer signals at a set timing interval based upon receipt of the timer activation signal and for preventing transmission of the timer signals based upon receipt of the timer de-activation signal, display means coupled to the count-down logic means for receiving the timer signals therefrom and displaying elapsed time from receipt of timer signals up to their cessation; and battery means for supplying electric energy for operation.

3. The portable flow timer device as set forth in claim 2 wherein the electric timer means is encased in a rigid openable container.

4. The portable flow timer device as set forth in claim 2 wherein timing interval of the resetable count-down logic means is adjustable.

5. The portable flow timer device as set forth in claim 2 wherein timing interval of the resetable count-down logic means is set at 1/100th of a second.

6. The portable flow timer device as set forth in claim 2 further including lamp test means coupled to the display means and battery means for checking their operability.

\* \* \* \* \*